United States Patent
Kong et al.

(10) Patent No.: US 11,794,646 B2
(45) Date of Patent: Oct. 24, 2023

(54) OPENING SYSTEM OF VEHICLE FOR AVOIDING INTERFERENCE OF DOOR HAVING CAMERA MONITORING SYSTEM AND CONTROL METHOD THEREOF

(71) Applicants: Hyundai Motor Company, Seoul (KR); Kia Motors Corporation, Seoul (KR)

(72) Inventors: Nak Kyoung Kong, Gyeonggi-do (KR); Seung Sik Han, Gyeonggi-do (KR); Jong Min Park, Seoul (KR); Ki Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 556 days.

(21) Appl. No.: 17/093,072

(22) Filed: Nov. 9, 2020

(65) Prior Publication Data

US 2021/0355733 A1 Nov. 18, 2021

(30) Foreign Application Priority Data

May 15, 2020 (KR) .................. 10-2020-0058466

(51) Int. Cl.
*E05F 15/00* (2015.01)
*B60Q 9/00* (2006.01)
*E05F 15/40* (2015.01)
*G08G 1/16* (2006.01)
*E05B 77/54* (2014.01)
*B60Q 1/32* (2006.01)

(52) U.S. Cl.
CPC ............. *B60Q 9/008* (2013.01); *B60Q 1/324* (2022.05); *E05B 77/54* (2013.01); *E05F 15/00* (2013.01); *E05F 15/40* (2015.01); *G08G 1/161* (2013.01); *E05Y 2400/45* (2013.01); *E05Y 2400/54* (2013.01); *E05Y 2900/531* (2013.01)

(58) Field of Classification Search
CPC ......... B60Q 9/008; B60Q 1/324; E05F 15/40; E05F 15/00; E05B 77/54; G08G 1/161; E05Y 2400/45; E05Y 2400/54; E05Y 2900/531
See application file for complete search history.

(56) References Cited

FOREIGN PATENT DOCUMENTS

KR 100101489 7/1996

*Primary Examiner* — Mathew Franklin Gordon
(74) *Attorney, Agent, or Firm* — Fox Rothschild LLP

(57) ABSTRACT

An opening system of a vehicle for avoiding interference of a door having a camera monitoring system (CMS) includes: the door in which the CMS is installed and which is slidably openable, an input device configured to receive an input request for opening the door, a processor configured to calculate a sliding opening trajectory of the door, and a controller configured to direct the CMS to be accommodated in the door when the door is opened and perform locking of the door when interference is determined as occurring in the opening trajectory of the door calculated in the processor based on surroundings information received through an image capturing device.

10 Claims, 4 Drawing Sheets

OPENING SYSTEM OF VEHICLE FOR AVOIDING INTERFERENCE OF DOOR HAVING CAMERA MONITORING SYSTEM AND CONTROL METHOD THEREOF

CROSS-REFERENCE TO RELATED APPLICATION

This application claims under 35 U.S.C. § 119(a) the benefit of Korean Patent Application No. 10-2020-0058466 filed on May 15, 2020, the entire contents of which are incorporated herein by reference.

BACKGROUND

(a) Technical Field

The present disclosure relates to an opening system of a vehicle for avoiding interference of a door having a camera monitoring system and a control method thereof, more particularly, to the opening system capable of calculating an opening trajectory of a sliding door having a camera monitoring system (CMS) and selectively opening the sliding door.

(b) Description of the Related Art

In general, a door of a vehicle is configured to be directly opened and closed by a user. That is, the user manually pulls a handle interlocked with a locking device of the door to unlock the locking device and opens the door by pushing the door or closes the door by pulling the handle of the door.

Thus, in the case of a door which is opened due to a manual operation, the door may be damaged due to impact with an object or structure located in the surroundings of the vehicle. In addition, in the case of certain vehicles including various types of doors, there is a problem in that a user may be unfamiliar with opening and closing a particular type of door, and thus interference with an object or structure in the vicinity of the vehicle or with an adjacent vehicle may occur.

Further, a driver checking the surroundings of the vehicle whenever exiting the vehicle causes inconvenience for the driver. Since a configuration for checking the surroundings of the vehicle is not provided to a passenger sitting on a rear seat, when the passenger does not directly check a side of the vehicle, there is a problem in that interference of the door cannot be determined and the passenger does not recognize an opening trajectory of the door.

SUMMARY

In one aspect, the present disclosure provides a system for preventing interference when a door of a vehicle having a camera monitoring system (CMS) is opened.

In another aspect, the present disclosure provides an opening system for avoiding interference of a door having a CMS, which prevents damage to a door or a CMS by performing a locking of a door which causes interference as a passenger rides in a vehicle from the outside of the vehicle.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides an opening system of a vehicle for avoiding interference of a door having a camera monitoring system (CMS), which includes: the door in which the CMS is installed and which is slidably openable, an input device configured to receive an input request for opening the door, a processor configured to calculate a sliding opening trajectory of the door, and a controller configured to direct the CMS to be accommodated in the door when the door is opened and perform a locking of the door when interference is determined as occurring in the opening trajectory of the door calculated in the processor on the basis of surroundings information received through an image capturing device.

In addition, the controller may be configured to receive the surroundings information of a vehicle, which is received through one or more of the CMS and a rear camera as the image capturing device, and may determine whether the interference occurs in the sliding opening trajectory of the door from the processor.

Further, when the interference occurs in the sliding opening trajectory of the door, the controller may be configured to transmit a warning through an alarm device.

Further, the alarm device may include one or more among a cluster, a lamp, or a speaker, which are located outside the door of the vehicle.

In another exemplary embodiment, the present disclosure provides a control method of avoiding interference of a door having a camera monitoring system, which includes receiving, by an input device, a request for opening a door and information on a vehicle, calculating, by a processor, a sliding opening trajectory of the door, determining, by a controller, whether the calculated sliding opening trajectory of the door is interfered with, when the calculated sliding opening trajectory of the door is interfered with, setting, by the controller, a locking of the door in which the interference occurs, and slidably opening, by the controller, an openable door.

In addition, the setting, by the controller, of the locking of the door in which the interference occurs when the calculated sliding opening trajectory of the door is interfered with, may include transmitting, by the controller, a warning with respect to the door, in which the interference occurs, through an alarm device.

Further, the slidably opening, by the controller, of the openable door may include accommodating, by the controller, the CMS of the opened door.

Further, the receiving of the request for opening the door may include determining whether an input of a door handle of the vehicle is applied or an input request for opening the door is applied from outside of the vehicle.

When the input request for opening the door is applied from the outside of the vehicle, the control method may further include deploying the CMS.

In addition, the determining, by the controller, whether the calculated sliding opening trajectory of the door is interfered with may include storing surroundings information through an image capturing device of the vehicle, and comparing the surroundings information with the sliding opening trajectory of the door.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
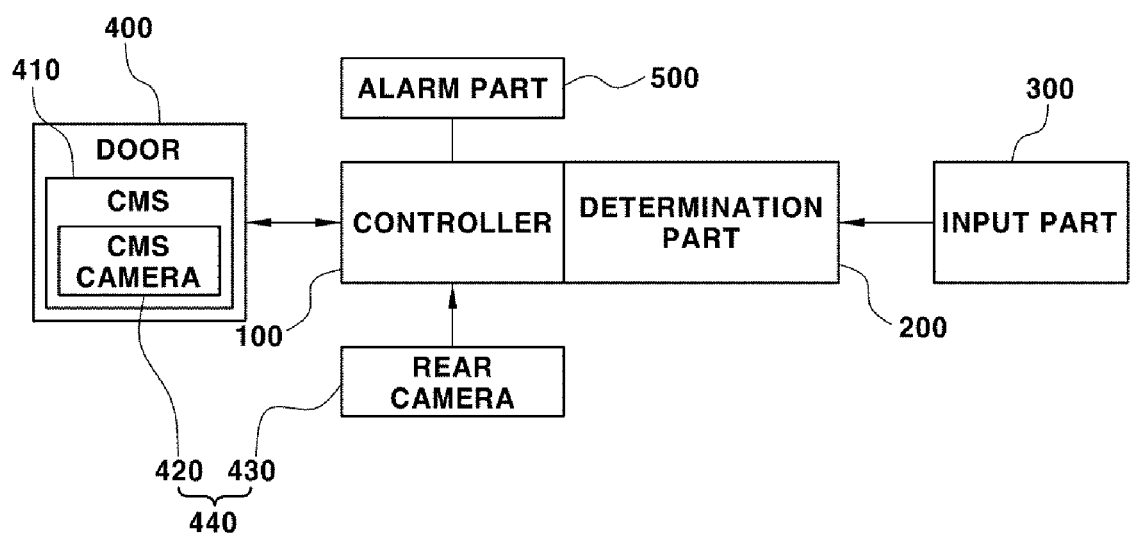
FIG. 1 is a block diagram illustrating an opening system for avoiding interference of a door having a camera monitoring system (CMS) according to one embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in more detail with reference to the accompanying drawings. The embodiments of the present disclosure can be modified in various forms, and the scope of the present disclosure should not be construed as being limited to the following embodiments. These embodiments are provided to more fully describe the present disclosure to those skilled in the art.

As provided herein, as a name of a component in the present specification, "CMS 410" means a camera monitoring system configured to capture an image using a camera located at a side of a vehicle to display the image in an interior of the vehicle and refers to all systems configured to be accommodated in a door 400.

Further, as a component in the present specification, "door 400" includes but is not limited to a target which slides. This is a concept including both the door 400 of which a lower end is pivoted to be opened based on a loop and the door 400 sliding in one direction and both directions.

Hereinafter, embodiments will be described in detail with reference to the accompanying drawings, and in describing with reference to the accompanying drawings, the same or corresponding components are assigned the same reference numerals, and duplicate descriptions thereof will be omitted therein.

FIG. 1 is a block diagram illustrating a coupling between components of an opening system for avoiding interference of the door 400 having the CMS 410 according to one embodiment of the present disclosure.

The opening system of a vehicle for avoiding interference of the door 400 having the CMS 410 preferably includes the door 400 that is preferably a sliding door in which the CMS 410 is engaged and located. In addition, the door 400 is configured to protrude outward from a vehicle body and open to a front side or a rear side of the vehicle. One embodiment of the present disclosure includes the door 400 located at both sides sliding to the front side of the vehicle and is configured such that, in a state in which the door 400 located at one side is interfered with, a passenger is capable of exiting the vehicle through the door 400 located at the other side.

The CMS 410 includes a CMS camera 420 capable of capturing an image of a side surface, and a display unit located in the interior of the vehicle and configured to display the captured image. In one embodiment of the present disclosure, a driving force may be applied to direct the CMS 410 to be accommodated in a space inside the door 400, and the CMS 410 may be configured to be accommodated in the door 400 according to an opening input of the door 400. In a closed state of the door 400 or when the vehicle is driving, the CMS 410 may be deployed to the outside of the door 400. A method of accommodating and deploying the CMS 410 is not limited, and various types of driving methods may be used.

An input device (or "input part") 300 for receiving an opening signal of the door 400 may include a handle located in the door 400 and/or a smart key which is capable of starting the vehicle or inputting an opening signal of the door 400 from the outside of the vehicle. In addition, the input device 300 may be configured to communicate with a controller located in the vehicle so as to receive gear shift information of the vehicle and starting information thereof.

A request or driving information of the vehicle, which is received by the input device 300, is received by a controller 100, and the request or the driving information is compared with an opening trajectory of the door 400 calculated in a processor (or "determination part") 200 to determine whether the vehicle is interfered with a structure located therearound.

In one embodiment of the present disclosure, the controller 100 may be configured to receive information on whether the CMS 410 is operated, information on a gear shift state, information on a gear stage currently input to the vehicle, image information received from the rear camera 430, information on a starting state of the vehicle, and information on an opening request input with respect to the door 400 and transmit an alarm for locking of the door 400 and preventing the opening thereof on the basis of the above received information.

The opening request input with respect to the door 400 according to the present disclosure may include a signal for opening the door 400 or a signal for preparing an opening of the door 400. For example, the opening request input may include a case in which a gear of the vehicle is applied as a reverse gear or a case in which a locking release signal of the door 400 is received from the outside.

In addition, the controller 100 is configured to receive surroundings information of the vehicle, which is received through an image capturing device 440, in a process of switching the parking state of the vehicle and determine a protrusion and a parking interval at a parking location on the basis of the received image information. In one embodiment of the present disclosure, the image capturing device 440 may be comprised of one or more of the CMS camera 420 or the rear camera 430 of the CMS 410.

When the door 400 is opened, the controller 100 is configured to direct the CMS 410 to be accommodated in the door 400 and display a rear side image of the vehicle through the rear camera 430. More preferably, the controller 100 is configured to display the rear side image, which is captured by the rear camera 430, through the display unit of the CMS 410.

Another embodiment of the present disclosure is configured such that, when an input request for opening the door 400 is applied from the outside of the vehicle, deployment of the CMS 410 accommodated in the parking state is performed to detect a protrusion, and, as the door 400 is opened, the CMS 410 is accommodated in the door 400.

An alarm device (or "alarm part") 500 is configured to notify a user by transmitting a warning when interference occurs in a sliding opening trajectory of the door 400. The alarm device 500 may be configured in the form of a lamp located outside the door 400 such that an alarm is provided to the user who attempts to ride in the vehicle and may generate a warning sound through a speaker such that a notification may be provided to a passenger exiting the vehicle, and the notification may be provided to a cluster in the form of a warning.

As described above, the controller 100 of the opening system for avoiding interference of the door 400 having the CMS 410 according to the present disclosure is configured to determine whether interference occurs when the door 400 is opened on the basis of information on the vehicle and the sliding opening trajectory of the door 400, which is calculated by the processor 200, and configured to perform a locking of the door 400 in which interference occurs to fundamentally block an opening of the door 400 and provide various types of alarms to the user.

Figure 2:
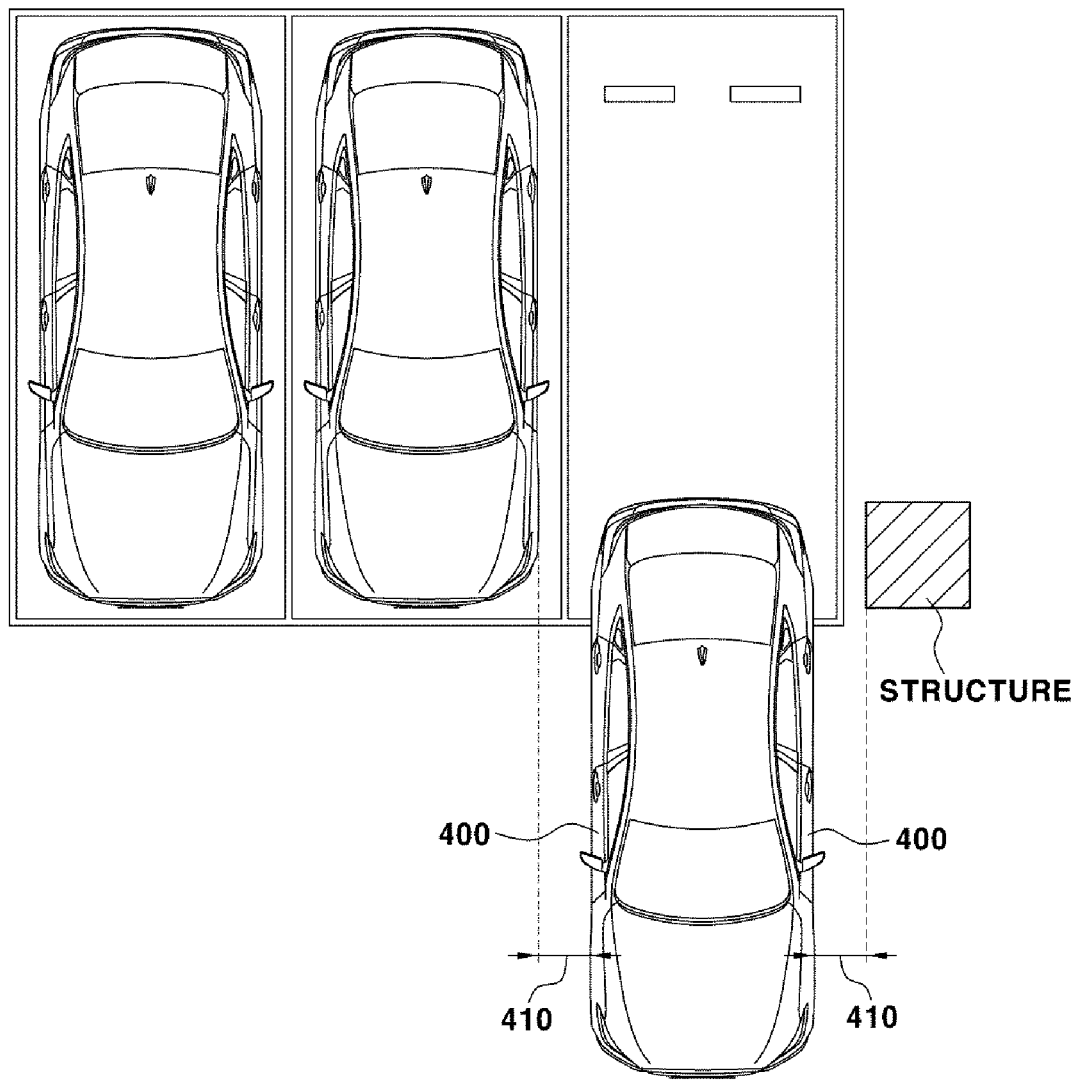
FIG. 2 is a diagram illustrating a driving relationship of a CMS in a parking state of a vehicle in accordance with one embodiment of the present disclosure.

FIG. 2 is a diagram illustrating a configuration for determining whether interference occurs due to a structure when the vehicle is parked through the opening system for avoiding interference of the door 400 having the CMS 410 according to one embodiment of the present disclosure.

In one embodiment of the present disclosure configured such that the vehicle is parked at a position adjacent to a structure, the controller 100 determines whether a reverse gear is applied on the basis of gear information of the vehicle. When the reverse gear is determined as being applied, the controller 100 receives surroundings information of the vehicle by the CMS 410 and receives a sliding opening trajectory of the door 400, which is calculated through the processor 200.

On the basis of the received surroundings information of the vehicle and the sliding opening trajectory of the door 400, the controller 100 determines whether interference occurs when the door 400 is opened, and, when there is a probability of collision of the door 400, the controller 100 transmits a warning through the alarm device 500, and simultaneously performs locking of the door 400 in which the probability of collision exists.

In a state in which the reverse gear of the vehicle is applied, the CMS 410 transmits the surroundings information of the vehicle to the controller 100, and the controller 100 is configured to calculate a distance between the vehicle and a structure around the vehicle on the basis of the captured surroundings information of the vehicle. More preferably, the present disclosure is configured to capture the surroundings information of the vehicle using the CMS camera 420 and the rear camera 430 of the CMS 410. Thus, the controller 100 is configured to calculate a distance to the structure spaced apart from a side surface of the vehicle by correcting each image.

After the vehicle is parked, the door 400 with no interference is opened and controlled to allow the passenger to get off/out (i.e., exit the vehicle). Thus, the door 400 is opened, and simultaneously the CMS 410 is configured to be accommodated in the door 400. When at least one door 400 is opened, the CMS 410 located in each door 400 may be accommodated, and only the CMS 410 located in the door 400 being opened may be accommodated.

When the passenger exits in a state in which the CMS 410 is accommodated, the side surface image cannot be provided through the CMS camera 420 so that an image captured by the rear camera 430 is displayed on the display unit. More preferably, the controller 100 may perform correction such that the image captured by the rear camera 430 is equal to the image received from the CMS 410 to display the captured image on the display unit.

Thereafter, when the parking of the vehicle and exiting of the passenger are completed, the CMS 410 is switched to a sleep state.

Figure 3:
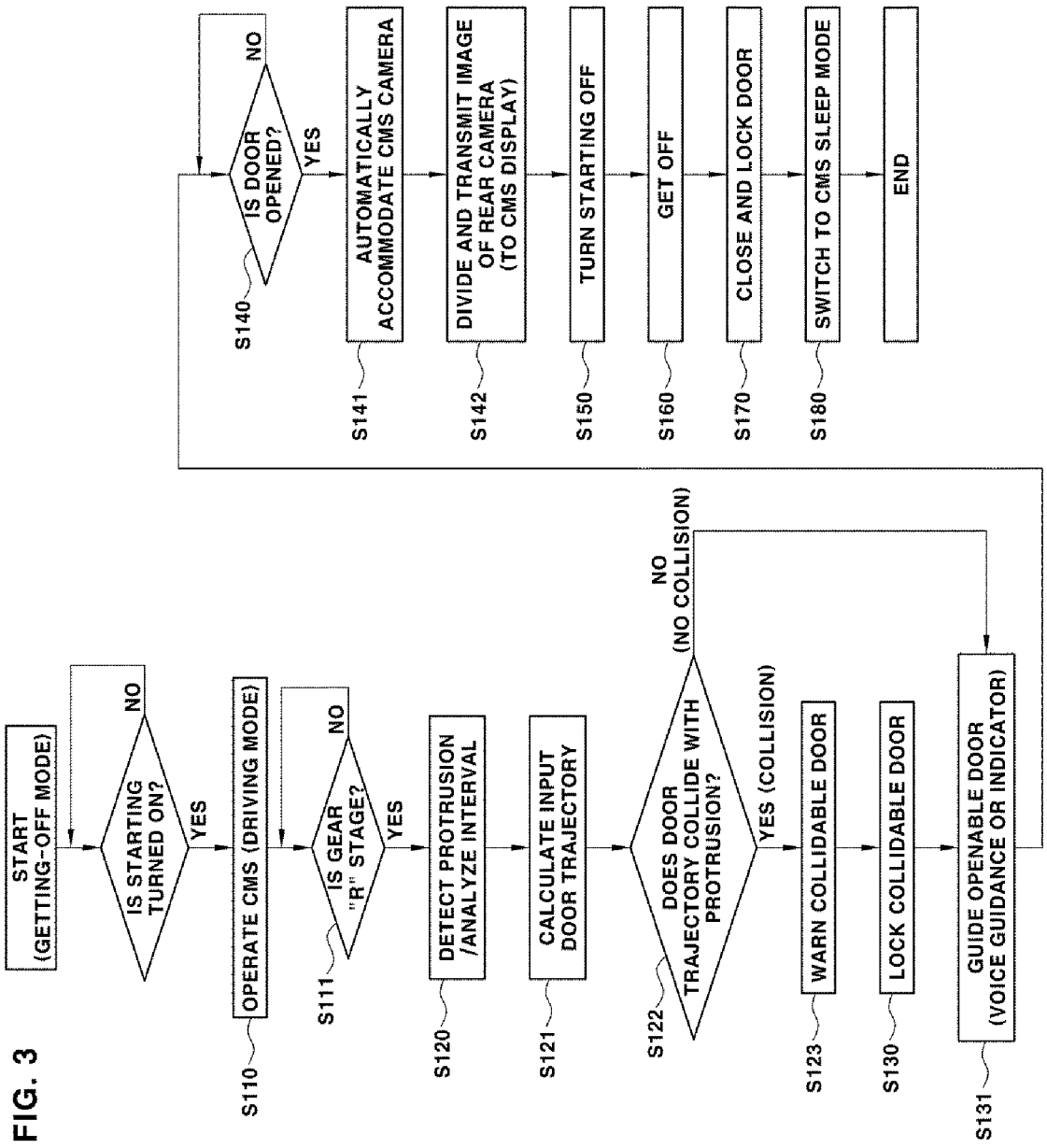
FIG. 3 is a flowchart illustrating a control method of an opening system for avoiding interference of a door having a CMS according to parking of a vehicle in accordance with one embodiment of the present disclosure.

FIG. 3 is a flowchart illustrating a method of controlling interference avoidance of the door 400 having the CMS 410 for avoiding interference of the door 400 in a parking environment of the vehicle according to one embodiment of the present disclosure.

In a state in which a starting of the vehicle is initially turned on, when the CMS 410 is driven (S110), it is determined whether a gear of the vehicle is applied as a reverse gear (S111). In a state in which the reverse gear of the vehicle is applied, the controller 100 is configured to receive the surroundings information of the vehicle through the CMS camera 420 of the CMS 410 and calculate a distance between the vehicle and a structure adjacent thereto (S120).

Further, the processor 200 calculates the sliding opening trajectory of the door 400 (S121), and the controller 100 determines whether interference or collision occurs when the door 400 is opened on the basis of the calculated sliding opening trajectory of the door 400 and the distance to the structure, which is calculated through the surroundings information of the vehicle (S122).

When the interference or collision occurs upon the opening of the door 400, the controller 100 is configured to notify the passenger of an alarm indicating a probability of collision through the alarm device 500 (S123). In addition, the controller 100 is configured to perform a locking of the door 400 having the probability of collision (S130). Additionally, the controller 100 is configured to provide a voice guidance or an indicator signal to notify the passenger of an openable door 400 having no probability of collision (S131). Then, the controller 100 is configured to determine whether the door 400 is opened (S140), and when the door 400 is opened, the CMS 410 is configured to be accommodated in the door 400 (S141).

However, when the interference or collision does not occur upon the opening of the door 400 (S122), the controller 400 is configured to guide an openable door 400 (S131), determine whether the openable door 400 is opened (S140), and direct the CMS 410 to be accommodated in the door 400 upon the opening of the openable door 400 (S141).

In a state in which the CMS 410 is accommodated in the door 400, the controller 100 is configured to display the side surface image of the vehicle, which is captured through the rear camera 430 located at a rear side of the vehicle, on the display unit (S142). When the passenger exits the vehicle, the CMS 410 is prevented from being accommodated to not provide the side surface image.

In a state in which the parking of the vehicle is completed, when the starting is turned off (S150) and exiting/getting out/getting off of the passenger is completed (S160), the opened door 400 is switched to a closed state and the locking is completed (S170). Thereafter, the CMS 410 is configured to be switched to a sleep mode (S180).

Figure 4:
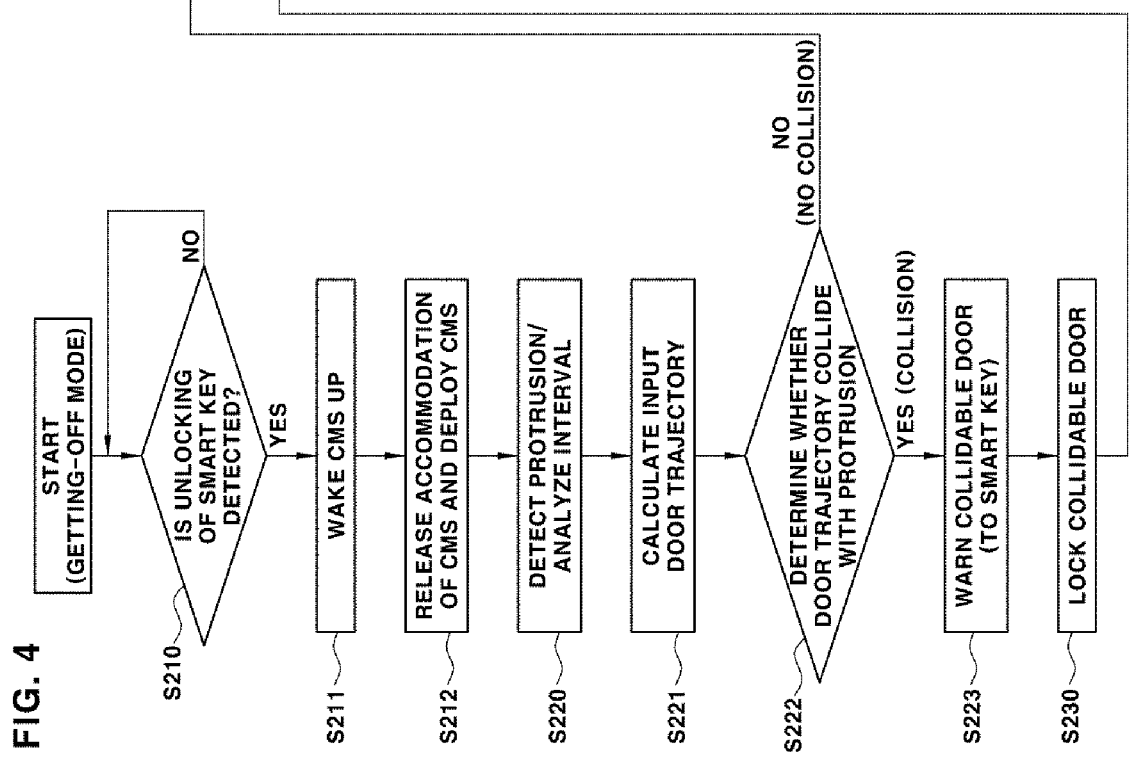
FIG. 4 is a flowchart illustrating a control method of an opening system for avoiding interference of a door having a CMS according to riding in a vehicle in accordance with another embodiment of the present disclosure.

FIG. 4 is a flowchart illustrating a method of controlling interference avoidance of the door 400 having the CMS 410 for avoiding interference of the door 400 when a request for opening the door 400 is applied from the outside of the vehicle in a state in which the vehicle is parked according to another embodiment of the present disclosure.

When a request input for opening the door 400 is applied from the outside of the vehicle in the state in which the vehicle is parked, the controller 100 determines whether a request for unlocking the door 400 from the smart key or a request for unlocking the door 400 through application (a request for opening the door 400) is applied (S210).

When the request for unlocking the door 400 is applied from the outside of the vehicle, the controller 100 switches to a wake-up state in which power is applied to the CMS 410 (S211) and performs deployment of the accommodated CMS 410 (S212).

The controller 100 is configured to determine a structure located outside the vehicle through the deployed CMS 410 (S220) and configured to direct the processor 200 to calculate a trajectory according to a sliding opening of the door 400 (S221).

Thereafter, the controller 100 determines whether the sliding opening trajectory of the door 400 is interfered with on the basis of the surroundings information of the vehicle (S222). When the sliding opening trajectory of the door 400 is not interfered with, the controller 100 informs a passenger of the door 400 which is openable (S231) and performs the opening of the door 400 (S240).

When the controller 100 determines that the sliding opening trajectory of the door 400 is interfered with on the basis of the surroundings information of the vehicle, the controller 100 is configured to inform the user of a probability of collision (S223) and switch a collidable door 400 to a locked state (S230). Thereafter, the controller 100 informs the user of an openable door 400 (S231) and determines whether to open the openable door 400 (S240).

When the openable door 400 is opened, the controller 100 directs the CMS 410 to be accommodated in the openable door 400 (S241) to prevent an unnecessary increase of the trajectory of the door 400, and, when the passenger rides in the vehicle (S250), the controller 100 switched the openable door 400 to the closed state (S260). Thereafter, in order to provide a rear side image of the vehicle, the controller 100 performs deploying the CMS 410 (S270).

As described above, the present disclosure provides a technique for determining whether interference with an external structure occurs when the door 400 having the CMS 410 is opened and locking the door 400 in advance and relates to the opening system for avoiding interference of the door 400 having the CMS 410 and the control method thereof which provide an effect of fundamentally blocking damage to the door 400.

The present disclosure can obtain the following effects according to a combination of the above-described embodiments and a configuration, which has been described above, and a use relationship.

In accordance with the present disclosure, there is an effect which is capable of providing an opening system for avoiding interference of a door having a camera monitoring system (CMS) to prevent damage caused due to an opening of a door.

In addition, in accordance with the present disclosure, there is an effect which is capable of providing an opening system for avoiding interference of a door having a CMS to provide convenience of opening a door to a user in consideration of surroundings of a vehicle when the vehicle is parked or the user is riding in the vehicle.

The foregoing detailed description illustrates the present disclosure. Further, the foregoing is intended to illustrate and describe the exemplary embodiments of the present disclosure, and the present disclosure may be used in various other combinations, modifications, and environments. That is, it is possible to make alternations or modifications without departing from the scope of the present disclosure disclosed in this specification, equivalents, and/or the technical or knowledge scope in the art to which the present disclosure pertains. The described embodiments are intended to illustrate the best mode for carrying out the technical spirit of the present disclosure and various modifications can be made in the specific applications and uses of the present disclosure. Therefore, the detailed description is not intended to limit the present disclosure as in the disclosed embodiments. Further, it should be construed that the appended claims are intended to include another embodiment.

What is claimed is:

1. An opening system of a vehicle for avoiding interference of a door having a camera monitoring system (CMS), the opening system comprising:
   the door in which the CMS is installed and which is openable;
   an input device configured to receive an input request for opening the door;
   a processor configured to calculate an opening trajectory of the door; and
   a controller configured to direct the CMS to be accommodated in the door when the door is opened and perform a locking of the door when interference is determined as occurring in the opening trajectory of the door calculated in the processor on the basis of surroundings information received through an image capturing device.

2. The opening system of claim 1, wherein the controller is configured to receive the surroundings information of the vehicle, which is received through one or more of the CMS or a rear camera as the image capturing device, and determine whether the interference occurs in the opening trajectory of the door from the processor.

3. The opening system of claim 1, wherein when the interference occurs in the opening trajectory of the door, the controller is configured to transmit a warning through an alarm device.

4. The opening system of claim 3, wherein the alarm device includes one or more of a cluster, a lamp, or a speaker, which are located outside the door of the vehicle.

5. A control method of avoiding interference of a door having a camera monitoring system (CMS), the control method comprising:
   receiving, by an input device, a request for opening the door and information on a vehicle;
   calculating, by a processor, an opening trajectory of the door;
   determining, by a controller, whether the calculated opening trajectory of the door is interfered with;
   when the calculated opening trajectory of the door is interfered with, setting, by the controller, a locking of the door in which the interference occurs; and
   opening, by the controller, an openable door.

6. The control method of claim 5, wherein the setting, by the controller, of the locking of the door in which the interference occurs when the calculated opening trajectory of the door is interfered with, includes transmitting, by the controller, a warning with respect to the door, in which the interference occurs, through an alarm device.

7. The control method of claim 5, wherein the opening, by the controller, of the openable door includes accommodating, by the controller, the CMS of the opened door.

8. The control method of claim 5, wherein the receiving of the request for opening the door includes determining whether an input of a door handle of the vehicle is applied or an input request for opening the door is applied from outside of the vehicle.

9. The control method of claim 8, further comprising:
   when the input request for opening the door is applied from the outside of the vehicle, deploying the CMS.

10. The control method of claim 5, wherein the determining, by the controller, whether the calculated opening trajectory of the door is interfered with includes:
    storing surroundings information of the vehicle through an image capturing device of the vehicle; and
    comparing the surroundings information with the opening trajectory of the door.

* * * * *